ated Apr. 11, 1922.
UNITED STATES PATENT OFFICE.

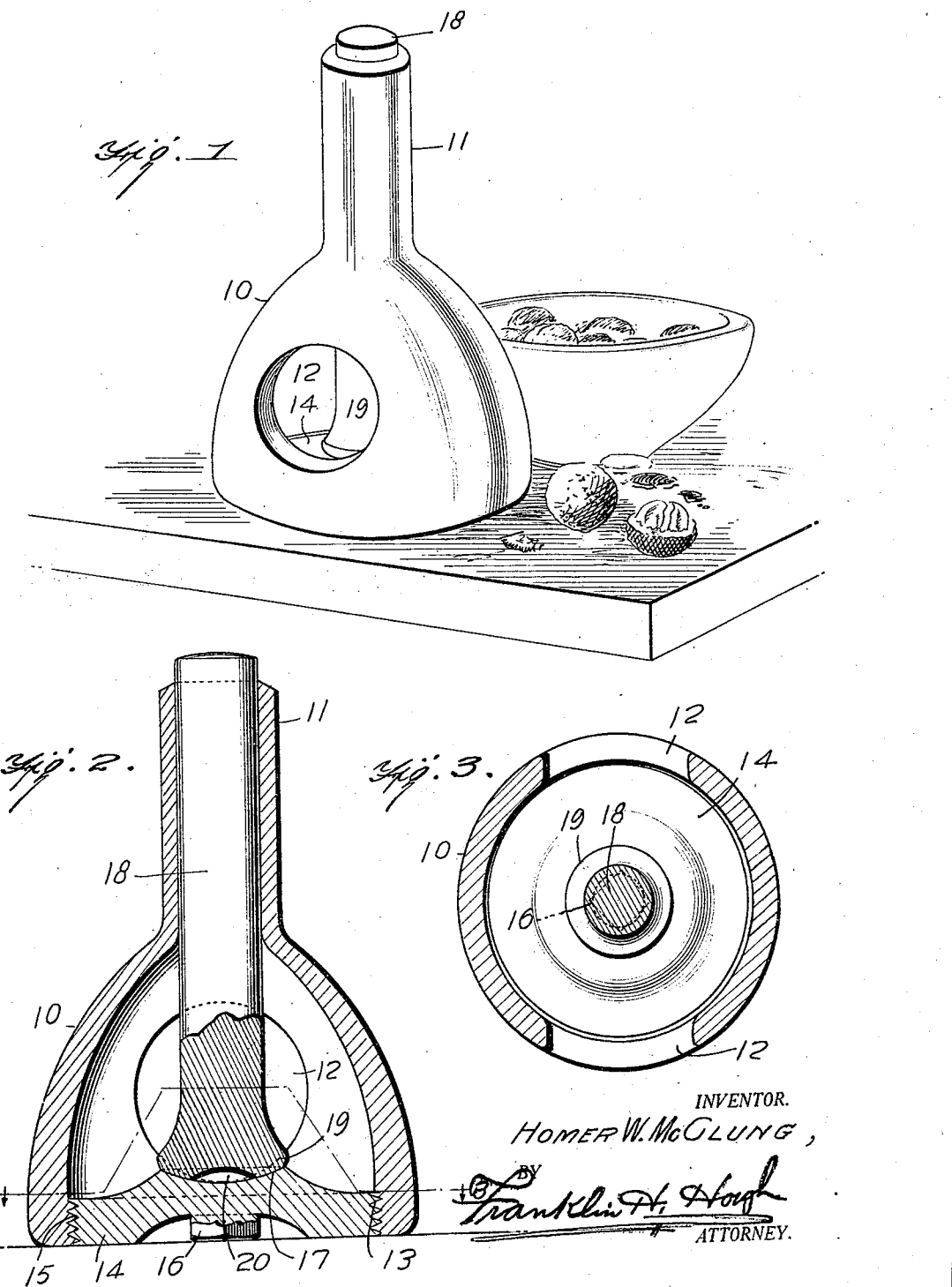

HOMER W. McCLUNG, OF BARRYTON, MICHIGAN.

NUTCRACKER.

1,412,249.  Specification of Letters Patent.  Patented Apr. 11, 1922.

Application filed January 24, 1921. Serial No. 439,551.

*To all whom it may concern:*

Be it known that I, HOMER W. McCLUNG, a citizen of the United States, residing at Barryton, in the county of Mecosta and State of Michigan, have invented certain new and useful Improvements in Nutcrackers, of which the following is a specification, reference being had therein to the accompanying drawings.

This invention relates to nut crackers and has for an object to provide a cracker having improved means for preventing the snapping of the shells when the nut is cracked.

A further object of the invention is to provide a device having a plunger movable in a fixed path relative to the base, whereby the cracking impact is always applied to the nut in such manner as to crack the shell with the least possible cracking of the meat.

A further object of the invention is to provide a dome-like structure having an anvil base with a plunger reciprocable vertically in alinement with the anvil, the sides of the dome being open to permit the insertion of a nut on the anvil under the plunger.

With these and other objects in view the device comprises certain novel arrangements, elements and combinations as will be hereinafter more fully described and claimed.

In the drawings:

Figure 1 is a perspective view of the improved nut cracker,

Figure 2 is a vertical diametrical sectional view, and

Figure 3 is a transverse sectional view taken on line 3—3 of Figure 2.

Like characters of reference indicate corresponding parts throughout the several views.

The improved nut cracker which forms the subject matter of this application comprises a dome 10 having a tubular offset 11 and with one or more openings 12 in one or more sides of the dome. The dome is preferably provided about its lower periphery or base with screw threads 13 and an anvil member 14 complementarily screw-threaded as indicated at 15 is seated in such threads. For the purpose of seating the anvil member, a multi-angular lug 16 is centrally located in the form of a nut, to which a wrench, or similar implement, may be applied.

The anvil member 14 is preferably provided with a concaved upper surface 17 for the purpose of receiving and retaining the nut which is manually inserted through one of the openings 12. In this position in the concave 17 it is immediately in axial alinement with the plunger 18. The plunger 18 is preferably provided with a head 19 having a concave 20 in its lower end complementary to the concavity 17 of the anvil.

In operation the plunger 18 is raised in any approved manner manually or by any usual and ordinary mechanism until there is sufficient clearance between the head 19 and the anvil to permit the manual insertion of a nut through one of the openings 12 into the concavity 17 of the anvil. The proceeding from this point depends upon the nature of the nut to be cracked. If the shell is of a variety easily cracked, the plunger may be simply released to fall upon the nut effecting the cracking in this manner; if of a less easily cracked variety, stress may be applied to the plunger by the hand giving the plunger a quick downward movement, the momentum and weight of which will crack the nut. If, however, of a variety requiring greater stress to crack, the upper end of the plunger 18 may be hit with a hammer or other implement, while the head 19 is in contact with the nut. Whatever the means to actuate the plunger 18, the cracked shell will be retained against trajecting by the dome 10. It is obvious that the cracked sections of shell will congregate in the lower peripheral hollow about the lower edge of the dome and may be removed by turning the dome partially upside down to permit the shells to escape through one of the openings 12. While the drawings indicate two of these openings 12, it is to be understood that the invention is in no way limited to such number, which may be more or less.

What I claim to be new is:

A nut cracker comprising a hollow dome internally screw-threaded at the base, a sleeve co-axial with the dome, a plunger inserted through the dome and slidable in the sleeve, and an anvil member having peripheral screw-threads proportioned to engage the screw threads of the dome, and a central nut supporting member in the path of movement of the plunger.

In testimony whereof I hereunto affix my signature in presence of two witnesses.

HOMER W. McCLUNG.

Witnesses:
  ROBT. SISCO,
  ORIE SISCO.